(12) United States Patent
Yonekubo

(10) Patent No.: US 7,210,793 B2
(45) Date of Patent: May 1, 2007

(54) LIGHT SOURCE UNIT AND PROJECTOR

(75) Inventor: Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 10/951,784

(22) Filed: Sep. 29, 2004

(65) Prior Publication Data

US 2005/0111240 A1 May 26, 2005

(30) Foreign Application Priority Data

Oct. 8, 2003 (JP) ............................. 2003-349607

(51) Int. Cl.
*G03B 21/28* (2006.01)
(52) U.S. Cl. .................................................. 353/81
(58) Field of Classification Search ................ 362/612, 362/620, 230, 555, 545, 800; 353/20, 33, 353/81, 122
See application file for complete search history.

(56) References Cited

U.S. PATENT DOCUMENTS

| 6,177,761 B1 * | 1/2001 | Pelka et al. ................. 313/512 |
| 6,578,982 B1 * | 6/2003 | Lynch ......................... 362/104 |
| 6,829,089 B2 * | 12/2004 | Agostinelli et al. ......... 359/466 |
| 6,877,859 B2 * | 4/2005 | Silverstein et al. ........... 353/20 |

| 2003/0133079 A1 * | 7/2003 | Cobb ............................ 353/31 |
| 2004/0047150 A1 * | 3/2004 | Hewson ...................... 362/227 |
| 2004/0207997 A1 * | 10/2004 | Stewart et al. ................ 362/31 |

FOREIGN PATENT DOCUMENTS

JP A 2003-282255 10/2003

OTHER PUBLICATIONS

Tsunemasa Taguchi, "Technologies for High-Intensity, High-Efficiency, and Long-Life White LED Illumination System," Technical Information Institute Co., Ltd. (English translation, pp. 1-8).

* cited by examiner

*Primary Examiner*—Diane Lee
*Assistant Examiner*—Robert Do
(74) *Attorney, Agent, or Firm*—Oliff & Berridge, PLC

(57) ABSTRACT

The enclosed embodiments provide a light source unit and a projector with high light utilization efficiency. The unit has a light emitting part for emitting light from a planer emitting region, a reflecting metal electrode provided on one side of the light emitting part, a square pyramid prism on the other side of the light emitting part, and a bottom surface of the prism that has substantially the same size and shape as the planer emitting region. The inclined surfaces of the square pyramid prism output light that has entered the square pyramid prism from the bottom surface in a specific direction. The reflecting metal electrode reflects the light that has been reflected by the inclined surfaces and transmitted through the bottom surface of the square pyramid prism.

16 Claims, 8 Drawing Sheets

LIGHT SOURCE UNIT AND PROJECTOR

BACKGROUND OF THE INVENTION

1. Field of Invention

Exemplary aspects of the present invention relate to a light source unit and a projector with the light source unit.

2. Description of Related Art

A related art solid-state light emitting source, such as an LED, specifically, a solid-state surface emitting source to emit light from a planer emitting region is used as a light source part. Further, Tsunemasa TAGUCHI, "Technology for Realizing High-brightness, High-efficiency, and Long Lifetime of White LED System", Technical Information Institute Co., Ltd., Mar. 27, 2003, pp. 47–50 discloses enhancing luminous efficiency of the solid-state surface emitting source.

SUMMARY OF THE INVENTION

A solid-state surface emitting source can be used as a light source part of a projector. In this case, it is necessary to consider not only the luminous efficiency of the light source, but also utilization efficiency of light in an optical system including a spatial light modulator unit and a projection lens. In an optical system including a light source part and a spatial light modulator unit, such as a liquid crystal light bulb and a tilt mirror device, spatial extent in which effectively treatable luminous flux exists is expressed as a product of area and solid angle (hereinafter, "etendue", Geometrical Extent). The product of area and solid angle is conserved in the optical system. Accordingly, the larger the spatial extent of the light source part becomes, the smaller the angle that can be taken by the spatial light modulator unit becomes. On this account, it is difficult to effectively use the luminous flux from the light source part.

Further, the planer emitting region of the solid-state surface emitting source functions as a so-called Lambertian surface. The brightness (luminance) of light from the Lambertian surface is constant regardless of an angle of observation and the same luminance in all directions. In the case where such a solid-state surface emitting source is used for the projector, the light from the solid-state surface emitting source is desirably guided efficiently in the direction toward the spatial light modulator unit. For this purpose, it is conceivable that, using a collimator lens, for example, the light from the solid-state surface emitting source is converted into collimated light and guided to the spatial light modulator unit. However, since the planer emitting region of the solid-state surface emitting source has a constant extent and it is not a point light source, it is difficult to efficiently collimate the light.

Furthermore, in the related art, a hemispherical lens is provided in contact with the planer emitting region to guide the light from the solid-state surface emitting source in a specific direction. The hemispherical lens functions as a lens having a positive refracting power (convex lens). Accordingly, the hemispherical lens can refract and guide the light from the planer emitting region in a predetermined direction. However, when the hemispherical lens is provided in contact with the planer emitting region, the image of the surface emitting source is often formed in a magnified form. When the image of the surface emitting source is magnified, its spatial extent becomes larger. Thereby, the above described etendue is conserved and the angle that can be taken by the spatial light modulator unit becomes smaller. On this account, it is difficult to effectively use the luminous flux from the light source part. Furthermore, in the case where the light output from the hemispherical lens is collimated by the collimated lens as described above, because the light source has an extent, it is difficult to effectively collimate the light. Thereby, it is difficult to effectively use the luminous flux from the light source part.

Exemplary aspect of the invention address the above described and/or other circumstances, and provide a light source unit and a projector with high light utilization efficiency.

In order to solve and/or address the above and/or other described problems, according to the first exemplary embodiment of the invention, a light source unit includes: a surface emitting part to emit light from a planer emitting region; a reflecting part provided on one surface side of the surface emitting part; and a conical prism or a pyramid prism provided on the other surface side of the surface emitting part and including an optical transparent member. A bottom surface of the conical prism or a bottom surface of the pyramid prism has substantially the same size and shape as the planer emitting region. An inclined surface of the conical prism or an inclined surface of the pyramid prism outputs light refracted by the inclined surface in a specific direction and guides light reflected by the inclined surface toward the bottom surface, of light that has entered the conical prism or the pyramid prism from the bottom surface. The reflecting part reflects light that has been reflected by the inclined surface and transmitted through the bottom surface and the surface emitting part again toward the conical prism or the pyramid prism can be provided.

The light from the surface emitting part enters the conical prism or the pyramid prism including an optical transparent member, such as glass, provided on the other surface side of the surface emitting part from the bottom surface. The light that has entered from the bottom surface travels within the prism and reaches the inclined surface of the prism. Here, depending on the incident angle to the inclined surface, there are cases where the light is refracted by an interface between the inclined surface and an external medium, such as air, and reflected by the interface. The light refracted by the interface of the inclined surface is output in a specific direction. The light reflected by the interface of the inclined surface travels further within the conical prism or the pyramid prism. For example, the light that has been reflected by a certain inclined surface travels within the prism and reaches another different inclined surface. Then, when the light that has traveled within the prism is refracted by another different inclined surface, the light is output in a specific direction. Further, when the light traveling within the prism is reflected by another different inclined surface, the light further has its optical path converted and travels within the prism. At that time, the light traveling within the prism while being reflected at plural times and returning toward the surface emitting part is considered. The light that has returned toward the surface emitting part is transmitted through the surface emitting part. The light that has been transmitted through the surface emitting part enters the reflecting part provided on one surface side of the surface emitting part, i.e., on the side surface opposed to the surface on which the conical prism or the pyramid prism is provided. The light that has entered the reflecting part is reflected by the reflecting part again toward the conical prism or the pyramid prism. The light that has been reflected again is transmitted through the surface emitting part, and enters the conical prism or the pyramid prism again from the bottom surface. While such reflection is repeated at plural times, the angle at which the light enters the inclined surface of the prism becomes different from the angle at which the light enters the inclined surface for the first time. Accordingly, the light at the angle refractable by the inclined surface is refracted by the inclined surface and output in a specific direction. In addition, the above described reflection steps are further repeated until the light that has not refracted but reflected by the inclined surface is refracted by the inclined surface and output. Therefore, by neglecting the light absorption in the prism or reflecting part, every light emitted from the surface emitting part can be output in a specific direction. Thereby, a light source unit with high light utilization efficiency can be obtained.

Furthermore, in order to guide the light from the surface emitting part in a specific direction, in place of a hemispherical lens, the conical lens or pyramid lens is used. Accordingly, the image of the surface emitting part is never magnified and formed. Thereby, the spatial extent of the image of the surface emitting part can be reduced. Therefore, since etendue is conserved, when the spatial light modulator unit is illuminated, the angle that can be taken by the spatial light modulator unit becomes larger. In addition, when the light emitted from the light source unit is collimated by a collimator lens, because the spatial extent is small, the light can be collimated efficiently.

Further, according to an exemplary embodiment of the first exemplary aspect of the invention, it is desired that an apex angle of the conical prism or an apex angle formed by opposed inclined surfaces of the pyramid prism is substantially 90°. Thereby, the light reflected by the inclined surface of the conical prism or the pyramid prism can be output by repeating the reflection steps more efficiently.

Further, according to an exemplary embodiment of the first exemplary aspect of the invention, it is desired that a diffusing plate to scatter incident light is provided on the bottom surface. By repeating the reflection steps, the light heading for the bottom surface from the inclined surface and the light reflected by the reflecting part, transmitted through the surface emitting part, and heading for the bottom surface again are diffused by the diffusing plate with its traveling direction directed toward a random direction. Accordingly, the rate of the angle at which the light enters the inclined surface of the prism being converted into the angle at which the light can be refracted and output becomes higher. Therefore, the light utilization efficiency can be made even higher.

Further, according to an exemplary embodiment of the first exemplary aspect of the invention, it is desired that the pyramid prism is a square pyramid prism having four inclined surfaces. Polarization splitter films to transmit a polarization component in a specific vibrating direction and reflecting a polarization component substantially perpendicular to the specific vibrating direction with respect to the respective inclined surfaces are formed on the four inclined surfaces. A pair of the opposed inclined surfaces further have wave plates to rotate a vibrating direction of the transmitted light substantially 90° on the polarization splitter films, and the four inclined surfaces output light in an aligned vibrating direction. In the case where the light source unit is applied to a projector, sometimes a liquid crystal light bulb is used as a spatial light modulator unit. The liquid crystal light bulb modulates the polarized state of incident light in response to an image signal and outputs the light. Accordingly, it is desired that the light source unit supplies polarized light in a specific vibrating direction, for example, p-polarized light efficiently in addition to having high light utilization efficiency. In the exemplary embodiment, the polarization splitter films are formed on the four inclined surfaces of the square pyramid prism. The polarization splitter films are constituted by dielectric multilayer films, for example. The polarization splitter films transmit p-polarized light and reflect s-polarized light of the light entering at a predetermined angle relative to the respective inclined surfaces, for example, substantially at 45°. Thereby, the light output from each of the four inclined surfaces is p-polarized light with respect to each inclined surface. Here, when the square pyramid prism is seen from the direction of the apex angle, of the four inclined surfaces, one pair of the opposed inclined surfaces are considered as one set of inclined surfaces. The square pyramid prism has two sets of inclined surfaces substantially in perpendicular directions. The polarization splitter film transmits a polarization component (p-polarized light) with respect to each inclined surface. Accordingly, when the square pyramid prism is seen as a whole, from two sets of inclined surfaces, polarization components in the substantially perpendicular two vibrating directions are output. In the exemplary embodiment, one set of inclined surfaces of two sets of inclined surfaces, i.e., a pair of the opposed inclined surfaces further have wave plates to rotate the vibrating direction of the transmitted light substantially 90° on the polarization splitter films. Accordingly, the p-polarized light transmitted through the wave plate has its vibrating direction rotated substantially 90°. Thereby, from the two sets of inclined surfaces (the four inclined surfaces) of the square pyramid prism, every polarized light in the same vibrating direction is output in a specific direction. Therefore, polarized light with high light utilization efficiency in a specific vibrating direction can be obtained.

Further, according to an exemplary embodiment of the first exemplary aspect of the invention, it is desired that a quarter wavelength plate or the diffusing plate to make the vibrating direction of polarized light random, is formed on the bottom surface. By the action of the polarization splitter films, the light repeating the above describe reflection steps is polarized light in a vibrating direction substantially perpendicular to a predetermined vibrating direction. The linearly polarized light is transmitted through the quarter wavelength plate on the bottom surface of the prism and converted into circularly polarized light. The circularly polarized light is transmitted through the surface emitting part. The circularly polarized light transmitted through the surface emitting part is reflected by the reflecting part and becomes reversely rotating circularly polarized light. Then, the reversely rotating circularly polarized light is transmitted through the surface emitting part and the quarter wavelength plate again, and converted into linearly polarized light rotated substantially 90° compared with the linearly polarized state as a polarized state before entering the quarter wavelength plate 607. Accordingly, when the light enters the polarization splitter film again, the light can be transmitted through the polarization splitter film. In the case where a diffusing plate for making the vibrating direction of light random is provided on the bottom surface of the prism, the light is diffused (scattered) with its vibrating direction toward a random direction compared with the polarized state before entering the diffusing plate. Accordingly, when the light enters the polarization splitter film again, the rate of being transmitted through the polarization splitter film becomes higher. Thereby, the light utilization efficiency can be enhanced.

Further, according to an exemplary embodiment of the first exemplary aspect of the invention, it is desired that the unit further includes a polarizing plate provided on the exit side of the pyramid prism or the conical prism to transmit a polarization component in a first vibrating direction and reflecting a polarization component in a second vibrating direction different from the first vibrating direction. In the exemplary embodiment, instead of providing the polarization splitter films on the inclined surfaces of the prism, the polarizing plate to transmit the polarization component in the first vibrating direction and reflecting the polarization component in the second vibrating direction different from the first vibrating direction is provided on the inclined surface side of the pyramid prism or the conical prism. Thereby, the light refracted by the inclined surface of the pyramid prism or the conical prism and output enters the polarizing plate. Then, the polarizing plate transmits the light in the first vibrating direction and outputs it. Further, the light in the second vibrating direction different from the first vibrating direction, is reflected by the polarizing plate. The light reflected by the polarizing plate has its vibrating direction changed by repeating the above described reflection steps and eventually output from the polarizing plate. Therefore, the polarized light in a specific vibrating direction can be obtained with high light utilization efficiency.

Further, according to an exemplary embodiment of the first exemplary aspect of the invention, it is desired that the unit further includes a quarter wavelength plate within an optical path between the pyramid prism or the conical prism and the polarizing plate. The polarized light in the second vibrating direction output from the pyramid prism or the conical prism and reflected by the polarizing plate is transmitted through the quarter wavelength plate, and becomes circularly polarized light and travels toward the prism. Then, the circularly polarized light is reflected by the reflecting part and becomes reversely rotating circularly polarized light, and travels within the prism again. The reversely rotating circularly polarized light is transmitted through the quarter wavelength plate again, and converted into linearly polarized light rotated substantially 90° compared with the linearly polarized state as a polarized state before entering the quarter wavelength plate. Thus, the light in the second vibrating direction has its vibrating direction rotated substantially 90° by being transmitted through the quarter wavelength plate twice and is converted into the first vibrating direction. Accordingly, the light that has been converted in the first vibrating direction is transmitted through the polarizing plate and output. Thereby, the light aligned in the first vibrating direction can be taken efficiently.

Further, according to an exemplary embodiment of the first exemplary aspect of the invention, it is desired that the unit further includes an optical guide part provided so as to surround the pyramid prism or the conical prism and having a reflecting surface to reflect light output from the pyramid prism or the conical prism formed therein. The optical guide part has a hollow circular cylinder shape with the inner circumferential surface as the reflecting surface, for example. Further, it is desired that the height of the optical guide part is substantially equal to the height of the pyramid prism or the conical prism. Since the pyramid prism or the conical prism is surrounded by the optical guide part, the light output from the prism is reflected by the reflecting surface. Therefore, the light never diffuses outwardly of the optical guide part. Thereby, the light can be taken out efficiently from the region having substantially the same area as the surface emitting part.

Further, a projector according to a second exemplary aspect of the invention, includes: the above described light source unit; a spatial light modulator unit to modulate light from the light source unit in response to an image signal; and a projection lens to project the modulated light. Thereby, a bright projection image can be obtained using light flow the light source unit with high light utilization efficiency.

BRIEF DESCRIPTION OF THE DRAWINGS

FIG. 3-1 is an emission intensity distribution chart of a related art light source unit;

FIG. 3-2 is an emission intensity distribution chart of the light source unit of exemplary embodiment 1;

FIG. 6-1 is a schematic of a light source unit of exemplary embodiment 3;

FIG. 6-2 is a schematic of the light source unit of exemplary embodiment 3;

FIG. 7-1 is a schematic of the light source unit of exemplary embodiment 3;

FIG. 7-2 is another schematic of the light source unit of exemplary embodiment 3;

DETAILED DESCRIPTION OF EXEMPLARY EMBODIMENTS

Hereinafter, exemplary embodiments of a light source unit and a projector according to exemplary aspects of the invention will be described in detail according to the drawings. Note that the invention is not limited by the exemplary embodiments.

Exemplary Embodiment 1

Figure 1:
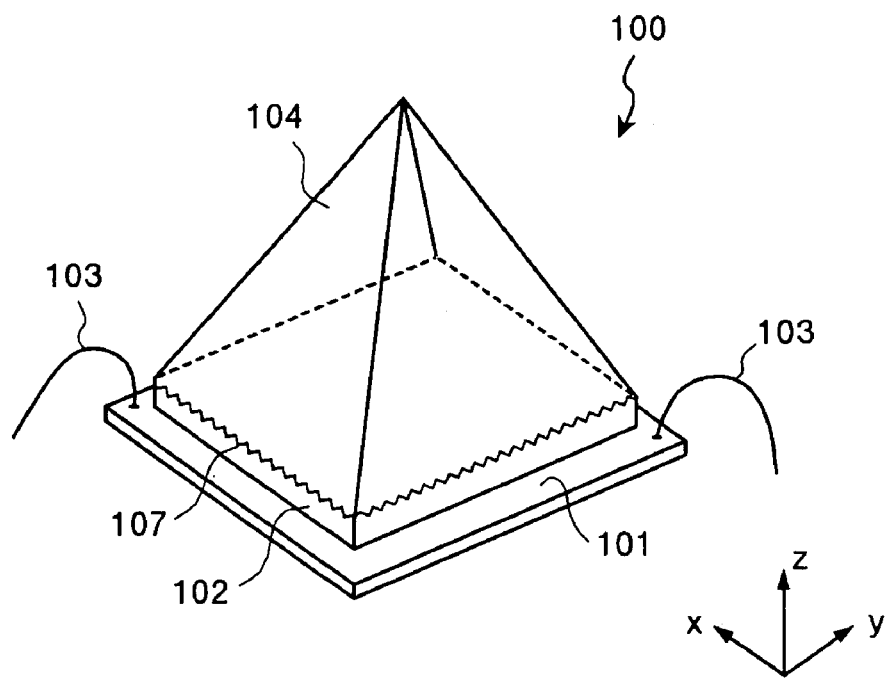
FIG. 1 is a schematic of a light source unit of exemplary embodiment 1.
Figure 2:
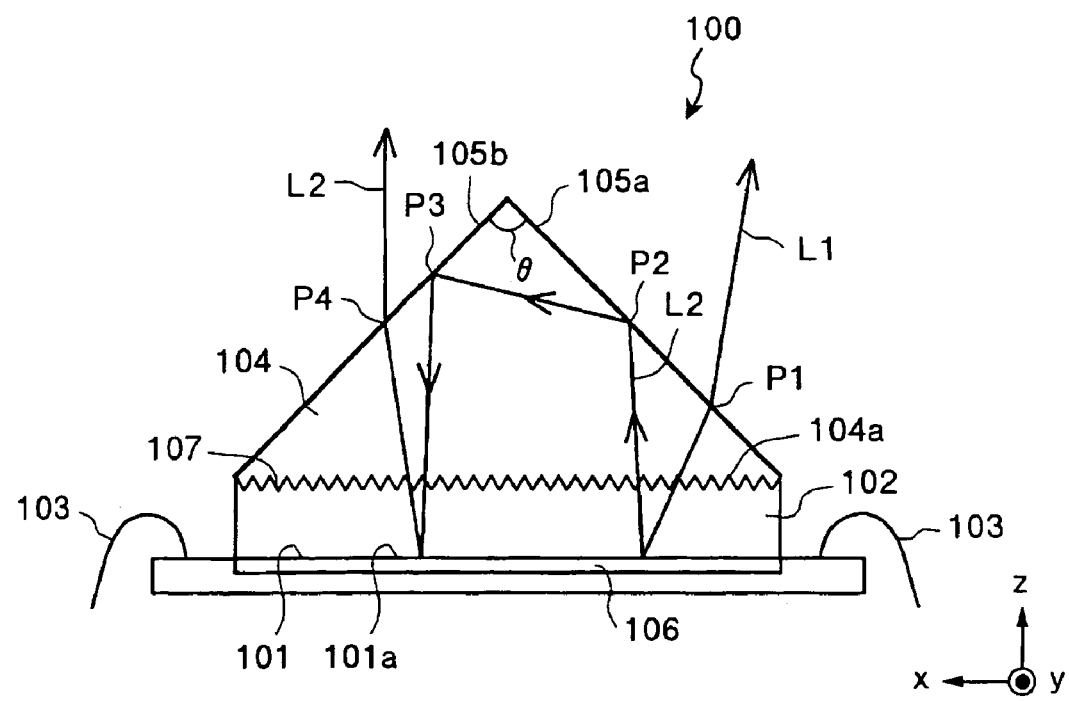
FIG. 2 is a schematic of the light source unit of exemplary embodiment 1.

FIG. 1 is a schematic of a light source unit 100 according to exemplary embodiment 1 of the invention. The light source unit 100 is a surface emitting LED. Further, FIG. 2 shows the sectional constitution of the light source unit 100. In FIG. 2, a surface emitting part 101 is formed by allowing a crystal of Ga, In, N, or the like to grow on a sapphire substrate 102. On ends of the surface emitting part 101, bonding wires 103 are provided. The surface emitting part 101 emits light with substantially equal intensity in all directions from a planer emitting region 101a. That is, the surface emitting part 101 functions as a so-called Lambertian surface. Additionally, on one surface side of the surface emitting part 101, a reflecting metal electrode 106 as a reflecting part is provided. Further, on the other surface side of the surface emitting part 101, a square pyramid prism 104 including an optical transparent member of high refractive index glass is fixed with an optical adhesive. On a bottom surface 104a of the square pyramid prism 104, a diffusing plate 107 to scatter incident light is provided.

Next, in the above described constitution, the behavior of the light emitted from the surface emitting part 101 will be described. The bottom surface 104a of the square pyramid prism 104 is substantially in a square shape. The bottom surface 104a has substantially the same size and shape as the planer emitting region 101a substantially in a square shape. Further, the refractive index n of the square pyramid prism 104 including high refractive index glass is substantially the same as or more than the refractive index of the sapphire substrate 102. The refractive index n of the square pyramid prism 104 may be at least equal to or more than 1.45. Preferably, the refractive index n of the square pyramid prism 104 is 1.77. Thereby, the light emitted from the surface emitting part 101 and traveling within the sapphire substrate 102 is never totally reflected by an interface between the sapphire substrate 102 and the bottom surface 104a of the square pyramid prism 104. Accordingly, the light from the surface emitting part 101 efficiently enters the square pyramid prism 104 from the bottom surface 104a.

Since the surface emitting part 101 is a Lambert surface as described above, the light having substantially the same intensity is emitted from the emitting point in all directions. The light that has entered the square pyramid prism 104 from the bottom surface 104a travels within the square pyramid prism 104 and reaches an inclined surface 105a. Here, depending on the incident angle to the inclined surface 105a, there are cases that the light is refracted or reflected by an interface between the inclined surface 105a and an external medium such as air. For example, light L1 is refracted by the interface of the inclined surface 105a in a position P1 and output in a specific direction.

Light L2 is not refracted but reflected by the interface of the inclined surface 105a in a position P2. The light that has been reflected in the position P2 further travels within the square pyramid prism 104. The light that has been reflected by the inclined surface 105a travels within the square pyramid prism 104 and reaches another different inclined surface 105b. In the case where the light L2 is reflected in a position P3 on the other different inclined surface 105b, the light has its optical path further converted and travels within the square pyramid prism 104 toward the bottom surface 104a. The light transmitted through the bottom surface 104a and returning toward the surface emitting part 101 is further transmitted through the surface emitting part 101. The light that has been transmitted through the surface emitting part 101 enters the reflecting metal electrode 106 as a reflecting part provided on one surface side of the surface emitting part 101, i.e., on a surface opposed to the surface on which the square pyramid prism 104 is provided. The light L2 that has entered the reflecting metal electrode 106 is reflected again by the reflecting metal electrode 106 toward the square pyramid prism 104.

The light L2 that has been reflected again is transmitted through the surface emitting part 101 and enters the square pyramid prism 104 from the bottom surface 104a again. While repeating such reflection in plural times, the angle at which the light enters the inclined surface 105b of the prism becomes different from the angle at which the light enters the inclined surface 105b for the first time. On this account, the light L2 at the angle retractable by the inclined surface 105b is refracted by the inclined surface 105b and output in a specific direction. Further, in the case where the light is not refracted but reflected by the inclined surface 105b, the above described reflection steps are further repeated until the light is refracted by the inclined surfaces 105a and 105b and output. Therefore, if the light absorption in the square pyramid prism 104 and the reflecting metal electrode 106 is neglected, every light emitted from the surface emitting part 101 can be output in a specific direction. Thereby, the light source unit 100 with high light utilization efficiency can be obtained.

Furthermore, the square pyramid prism 104 is used in place of the hemispherical lens to guide the light from the surface emitting part 101 in a specific direction. Accordingly, the image of the surface emitting part 101 is never magnified and formed. Thereby, the spatial extent of the image of the surface emitting part 101 can be reduced. Therefore, because the etendue is conserved, when the spatial light modulator unit is illuminated, the angle that can be taken by the spatial light modulator unit becomes larger. In addition, when the light output from the light source unit 100 is collimated by the collimator lens, because the spatial extent is small, the light can be collimated efficiently.

Further, on the bottom surface 104a, the diffusing plate 107 to scatter the light L2 is provided. The diffusing plate 107 can be arranged by forming a minute pattern on the bottom surface 104a or mixing diffusing beads in an adhesive layer of the bottom surface 104a. By repeating the above described reflection steps, the traveling directions of the light L2 heading to the bottom surface 104a from the inclined surface 105b and the light L2 reflected by the reflecting metal electrode 106, transmitted through the surface emitting part 101, and heading to the bottom surface 104a again is diffused by the diffusing plate 107 in random directions. Accordingly, the rate of the angle at which the light enters the inclined surface 105b of the square pyramid prism 104 being converted into the angle at which the light can be refracted by the inclined surface 105b and output becomes higher. Therefore, the light utilization efficiency can be made even higher.

Figures 1, 3:
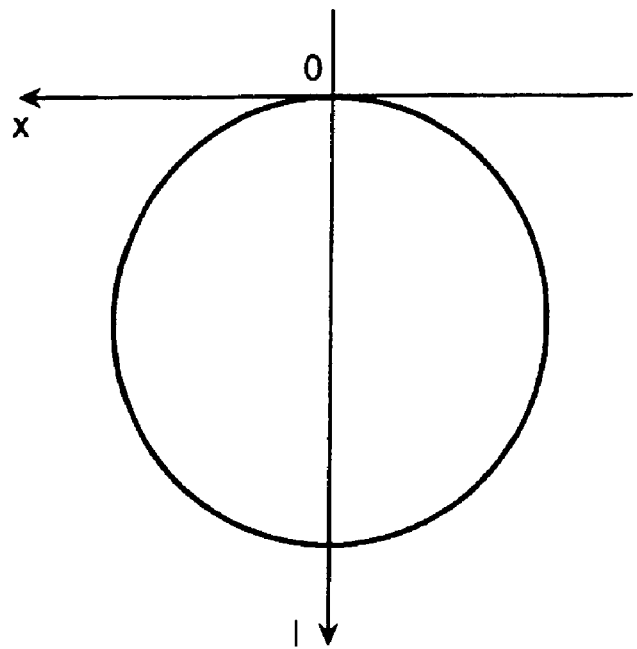
Figures 2, 3:
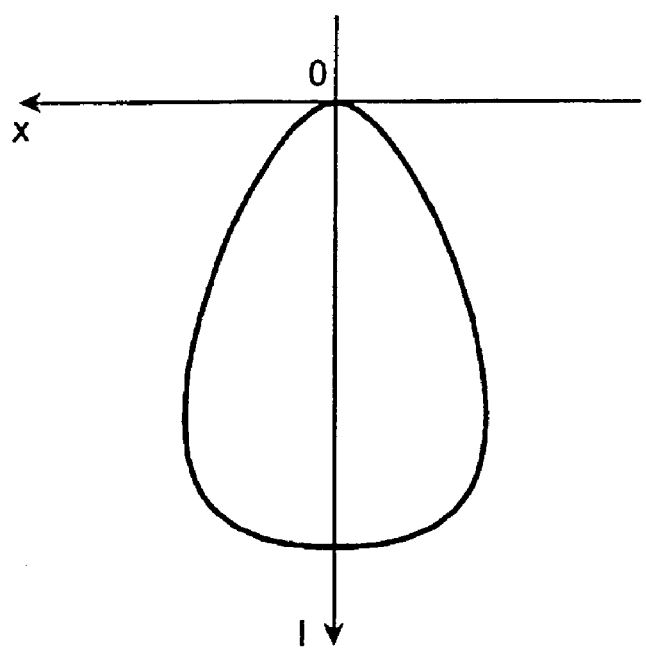

Next, intensity distribution of the light emitted from the light source unit 100 will be described. FIG. 3-1 shows emission intensity distribution of a related art surface emitting LED. The horizontal axis of FIG. 3-1 indicates the position of the light source (e.g., x direction in FIG. 2) and the vertical axis indicates an arbitrary light intensity coordinate I, respectively. As described above, the related art surface emitting LED emits light from the Lambert surface. Accordingly, as shown in FIG. 3-1, light having the same intensity distribution is emitted in all observation directions. In the exemplary embodiment, by the refraction of the inclined surfaces 105a and 105b of the square pyramid prism 104, light intensity is distributed within a fixed range with a direction of an apex angle of the square pyramid prism 104 as a center thereof. Accordingly, the light source unit 100 can efficiently emit light in a specific direction.

Figure 4:
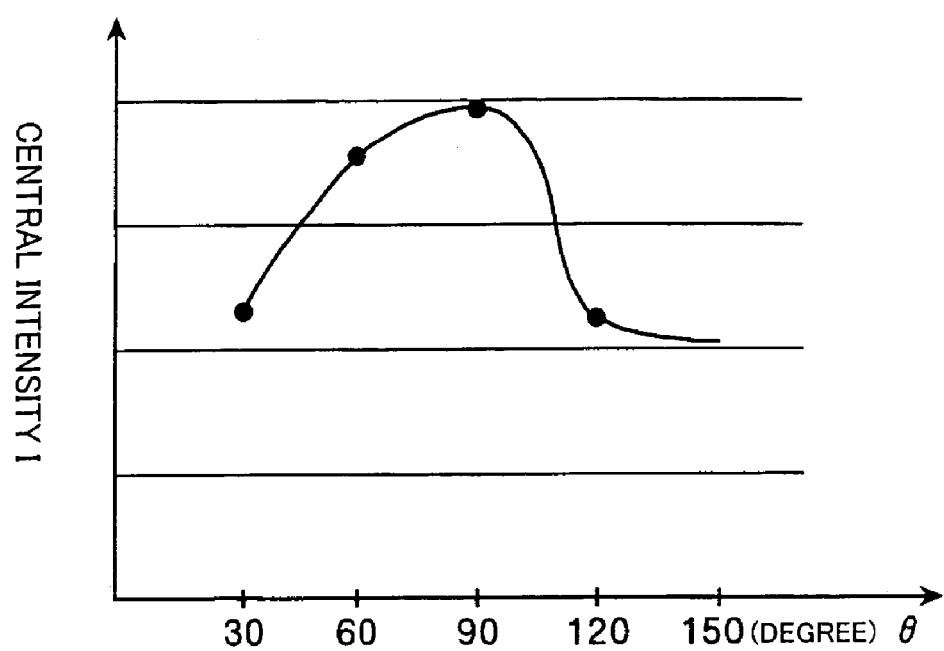
FIG. 4 is a chart showing the relationship between the apex angle of the prism and central intensity.

Further, FIG. 4 shows the relationship between the apex angle θ of the square pyramid prism 104 and intensity of emitted light with the direction of the apex angle as a center thereof. As clearly seen from FIG. 4, when the apex angle is nearly 90°, the intensity of the central portion of the emitted light becomes the maximum. In the exemplary embodiment, the angle θ formed by the opposed inclined surfaces 105a and 105b of the square pyramid prism 104 is substantially 90°. Thereby, the light reflected by the inclined surfaces 105a and 105b of the square pyramid prism 104 can be output after repeating the reflection steps more efficiently. Therefore, the intensity distribution of the central portion of the emitted light can be made larger.

Exemplary Embodiment 2

Figure 5:
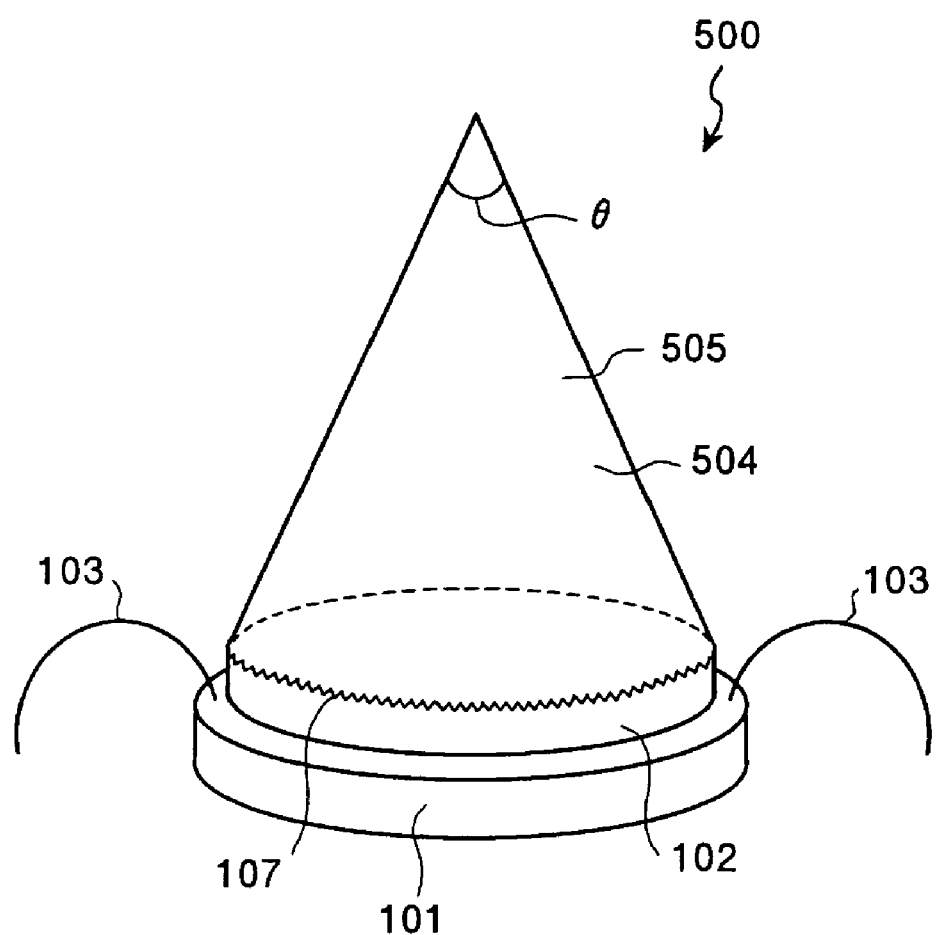
FIG. 5 is a schematic of a light source unit of exemplary embodiment 2.

FIG. 5 is a schematic of a light source unit 500 according to exemplary embodiment 2 of the invention. The square pyramid prism is used in exemplary embodiment 1, but exemplary embodiment 2 is different in the point where a conical prism is used. Other basic constitution is the same as in exemplary embodiment 1, and the same parts as in exemplary embodiment 1 are assigned with the same signs and overlapping description will be omitted. The light source unit 500 is a surface emitting LED. A circular surface emitting part 101 is formed by allowing a crystal of Ga, In, N, or the like to grow on a sapphire substrate 102. On ends of the circular surface emitting part 101, bonding wires 103 are provided. The surface emitting part 101 emits light with substantially equal intensity in all directions from a planer emitting region. That is, the surface emitting part 101 functions as a so-called Lambertian surface. Additionally, on one surface side of the surface emitting part 101, a reflecting metal electrode 106 (not shown) as a reflecting part is provided. Further, on the other surface side of the surface emitting part 101, a conical prism 504 including of an optical transparent member of high refractive index glass is fixed with an optical adhesive. On a bottom surface 104a (not shown) of the conical prism 504, a diffusing plate 107 to scatter incident light is provided.

By the constitution of exemplary embodiment, the same reflection steps as in the above described exemplary embodiment 1 is repeated, and every light emitted from the surface emitting part can be output in a specific direction. Thereby, a light source unit with high light utilization efficiency can be obtained.

Exemplary Embodiment 3

Figures 1, 6:
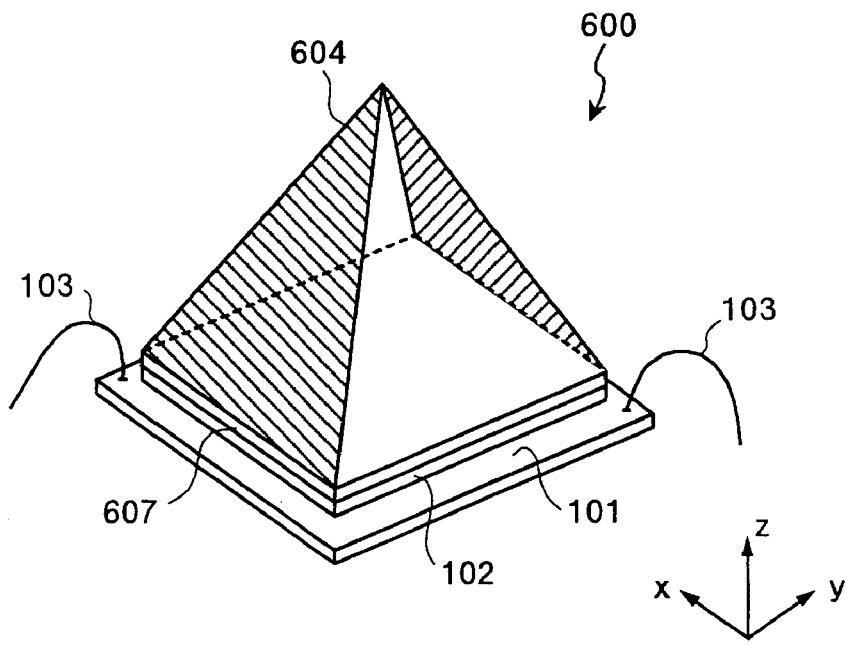
Figures 2, 6:
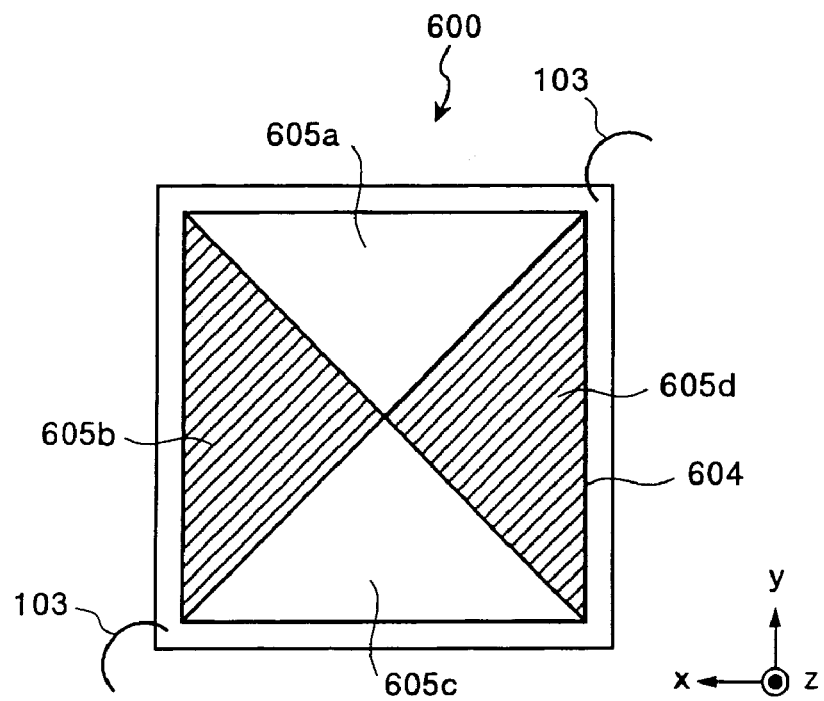

FIG. 6-1 is a schematic of a light source unit 600 according to the exemplary embodiment 3 of the invention. The exemplary embodiment is different from exemplary embodiment 1 in the point where polarized light in a specific vibrating direction is output in a specific direction. The same parts as in the above described exemplary embodiment 1 are assigned with the same signs and overlapping description will be omitted. The light source unit 600 is a surface emitting LED. Further, FIG. 6-2 is a view of the light source unit 600 seen from the direction of an apex angle θ of a square pyramid prism 604 (z axis direction). The apex angle θ is 90°. In FIG. 2, a surface emitting part 101 is formed by allowing a crystal of Ga, In, N, or the like to grow on a sapphire substrate 102. On ends of the surface emitting part 101, bonding wires 103 are provided. The surface emitting part 101 emits light with substantially equal intensity in all directions from a planer emitting region. That is, the surface emitting part 101 functions as a so-called Lambertian surface. Additionally, on one surface side of the surface emitting part 101, a reflecting metal electrode 106 (see FIGS. 7-1 and 7-2) as a reflecting part is provided. Further, on the other surface side of the surface emitting part 101, a square pyramid prism 604 including an optical transparent member of high refractive index glass is fixed with an optical adhesive. On a bottom surface 604a (not shown) of the square pyramid prism 604, a quarter wavelength plate 607 is provided.

As shown in FIG. 6-2, the square pyramid prism 604 has four inclined surfaces of a first inclined surface 605a, a second inclined surface 605b, a third inclined surface 605c, and a fourth inclined surface 605d. The first inclined surface 605a and the third inclined surface 605c are opposed. Further, the second inclined surface 605b and the fourth inclined surface 605d are opposed. On the four inclined surfaces 605a, 605b, 605c, and 605d, polarization splitter films 610 to transmit p-polarized light as a polarization component in a specific vibrating direction and s-polarized light as a polarization component substantially perpendicular to the specific vibrating direction with respect to each inclined surface are formed. The polarization splitter films 610 are constituted by dielectric multilayer films, and formed simultaneously on the four inclined surfaces 605a, 605b, 605c, and 605d.

To the second inclined surface 605b and the fourth inclined surface 605d as a pair of opposed inclined surfaces, on the polarization splitter films 610, sheet-like wavelength half wavelength plates 611 (shaded in FIG. 6-2) as wave plates to rotate the vibrating direction of the transmitted light substantially 90° are further fixed with an optical transparent adhesive. In the case where the light source unit 600 is applied to a projector, sometimes a liquid crystal light bulb is used as a spatial light modulator unit. The liquid crystal light bulb modulates the polarized state of incident light in response to an image signal and outputs the light. Accordingly, it is desired that the light source unit 600 supplies polarized light in a specific vibrating direction, for example, p-polarized light efficiently in addition to having high light utilization efficiency.

The polarization splitter films 610 formed on the four inclined surfaces 605a, 605b, 605c, and 605d transmit p-polarized light and reflects s-polarized light of the light entering at a predetermined angle relative to the respective inclined surfaces, for example, substantially at 45°. Thereby, the light output from the four inclined surfaces 605a, 605b, 605c, and 605d is p-polarized light with respect to the respective inclined surfaces 605a, 605b, 605c, and 605d. Of the four inclined surfaces 605a, 605b, 605c, and 605d, one set of inclined surfaces 605a and 605c and the other pair of inclined surfaces 605b and 605dc are provided substantially in perpendicular directions. The polarization splitter films 610 transmit p-polarized light as a polarization component with respect to each of the inclined surfaces 605a, 605b, 605c, and 605d.

Figures 1, 7:
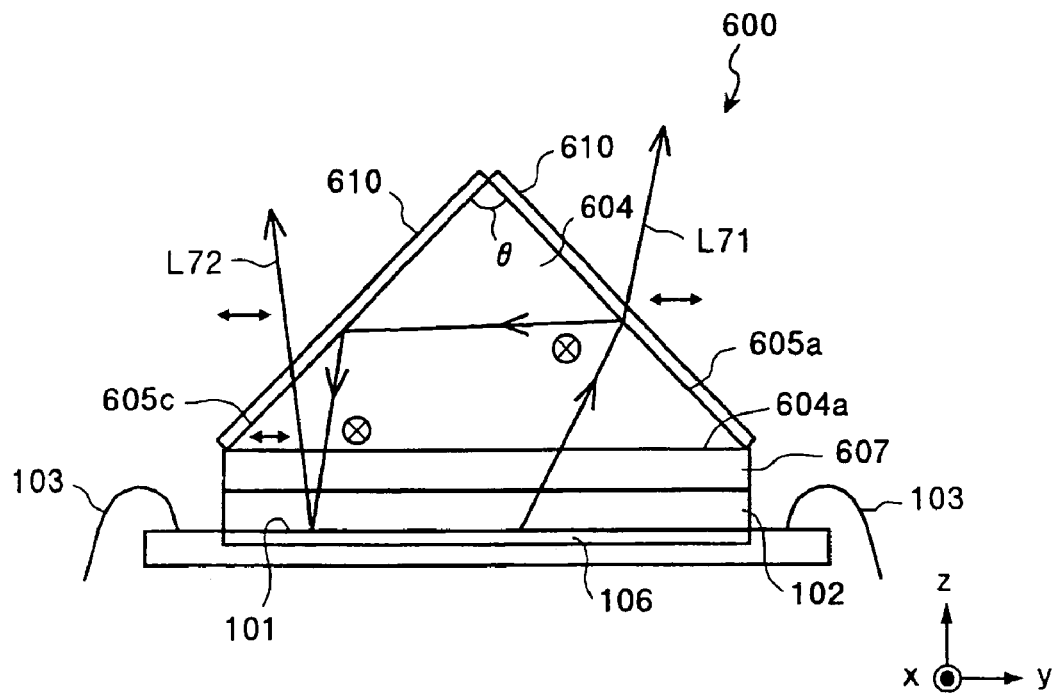
Figures 2, 7:
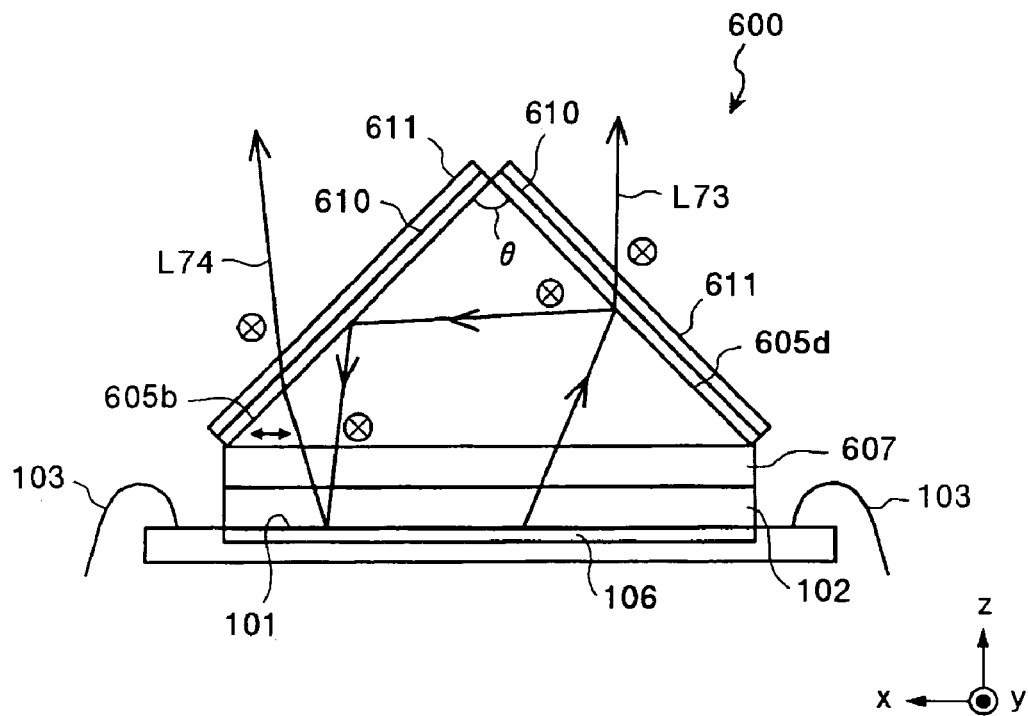

FIG. 7-1 shows the constitution of the first inclined surface 605a and the third inclined surface 605c. The randomly polarized light that has been emitted from the surface emitting part 101 is transmitted through the quarter wavelength plate 607, which will be described later, and travels into the square pyramid prism 604 from the bottom surface 604a of the square pyramid prism 604. The light traveling within the square pyramid prism 604 reaches the first inclined surface 605a. The p-polarized light L71 of the light that has reached the first inclined surface 605a is transmitted through the polarization splitter film 610 and output in a specific direction. Further, the s-polarized light of the light that has reached the first inclined surface 605a is reflected by the polarization splitter film 610 and enters the third inclined surface 605c opposed to the first inclined surface 605a. Here, the s-polarized light is further reflected by the polarization splitter film 610 of the third inclined surface 605c, and travels toward the bottom surface 604a. The s-polarized light traveling toward the bottom surface 604a is transmitted through the bottom surface 604a and enters the quarter wavelength plate 607. The quarter wavelength plate 607 is fixed to the bottom surface 604a with an optical transparent adhesive.

Then, the s-polarized light is transmitted through the quarter wavelength plate 607 and converted into circularly polarized light. The circularly polarized light is reflected by the reflecting metal electrode 106 and becomes reversely rotating circularly polarized light. Then, the reversely rotating circularly polarized light is transmitted through the surface emitting part 101 and the quarter wavelength plate 607 again, and converted into linearly polarized light rotated substantially 90° compared with the s-polarized state as a polarized state before entering the quarter wavelength plate 607, i.e., p-polarized light. Accordingly, when the p-polarized light L72 enters the polarization splitter film 610 of the third inclined surface 605c again, the light is transmitted through the polarization splitter film 610 and output.

Further, on the bottom surface 604a of the square pyramid prism 604, in place of the quarter wavelength plate 607, a diffusing plate to make the vibrating direction of light random may be provided. The diffusing plate can be arranged by forming a minute pattern on the bottom surface 604a or mixing diffusing beads in an adhesive layer between the bottom surface 604a and itself. Thereby, the incident light is diffused (scattered) with its vibrating direction toward a random direction compared with the polarized state before entering the diffusing plate (s-polarized state). Accordingly, when the light enters the polarization splitter film 610 again, the rate of being transmitted through the polarization splitter film 610 becomes higher. Thereby, the light utilization efficiency can be enhanced. Furthermore, when the number of times of the reflection steps are large or the reflectance is low, the advantage of enhancing the light utilization efficiency can be obtained by optimizing the diffusion degree of the diffusing plate.

Further, FIG. 7-2 shows the constitution of the second inclined surface 605b and the fourth inclined surface 605d in the sectional direction. The randomly polarized light that has been emitted from the surface emitting part 101 is transmitted through the quarter wavelength plate 607, and travels into the square pyramid prism 604 from the bottom surface 604a of the square pyramid prism 604. The light traveling within the square pyramid prism 604 reaches the fourth inclined surface 605d. The p-polarized light of the light that has reached the fourth inclined surface 605d is transmitted through the polarization splitter film 610. Here, on the polarization splitter film 610 of the fourth inclined surface 605d, the sheet-like half wavelength plate 611 as a wave plate to rotate the vibrating direction of the transmitted light substantially 90° is fixed with an optical transparent adhesive. Accordingly, the p-polarized light L73 that has been transmitted through the half wavelength plate 611 of the fourth inclined surface 605d has its vibrating direction rotated substantially 90° and output.

The s-polarized light that has been reflected by the polarization splitter film 610 of the fourth inclined surface 605d is further reflected by the polarization splitter film 610 of the second inclined surface 605b opposed to the fourth inclined surface 605d toward the bottom surface 604a. The s-polarized light traveling toward the bottom surface 604a is transmitted through the bottom surface 604a and enters the quarter wavelength plate 607.

Then, the s-polarized light is transmitted through the quarter wavelength plate 607 and converted into circularly polarized light. The circularly polarized light is reflected by the reflecting metal electrode 106 and becomes reversely rotating circularly polarized light. The reversely rotating circularly polarized light is transmitted through the surface emitting part 101 and the quarter wavelength plate 607 again, and converted into linearly polarized light rotated substantially 90° compared with the s-polarized state as a polarized state before entering the quarter wavelength plate 607, i.e., p-polarized light. Accordingly, when the p-polarized light enters the polarization splitter film 610 of the second inclined surface 605b, the light can be transmitted through the polarization splitter film 610. The p-polarized light transmitted through the polarization splitter film 610 of the second inclined surface 605b is further transmitted through the half wavelength plate 611. Accordingly, the light L73 transmitted through the half wavelength plate 611 of the second inclined surface 605b has its vibrating direction rotated to 90° and output.

Therefore, when the square pyramid prism 604 is seen as a whole, from the four inclined surfaces 605a, 605b, 605c, and 605d as two sets of inclined surfaces, every polarized light in the same specific vibrating direction is output in a specific direction. Accordingly, polarized light with high light utilization efficiency in a specific vibrating direction can be obtained.

In the exemplary embodiment, the light entering the opposed inclined surfaces, for example, the light entering the third inclined surface 605c from the first inclined surface 605a and the light entering from the fourth inclined surface 605d to the second inclined surface 605b are described. However, not limited to that, for example, the light reflected by the first inclined surface 605a enters the adjacent second inclined surface 605b and can be output from the square pyramid prism 604 as long as the total reflection condition and the polarized direction condition are satisfied. With respect to such light, the vibrating direction of the polarized light is aligned in the same direction as in the above described cases.

Exemplary Embodiment 4

Figure 8:
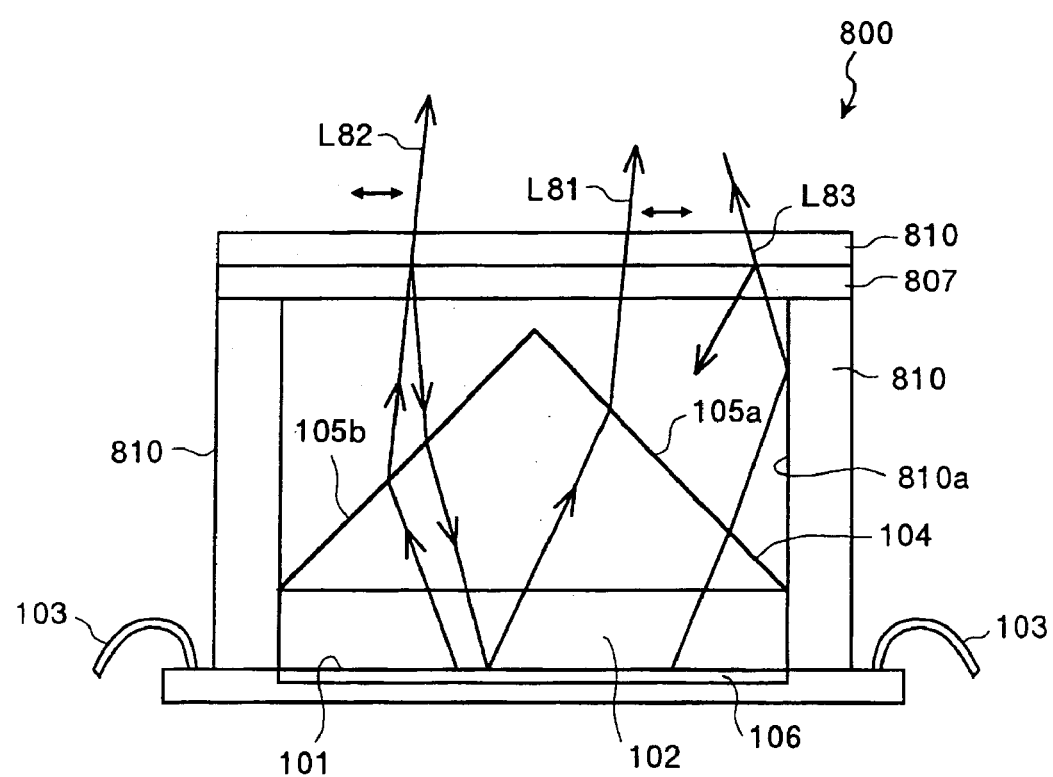
FIG. 8 is a schematic of a light source unit of exemplary embodiment 4.

FIG. 8 shows the sectional constitution of a light source unit 800 according to exemplary embodiment 4 of the invention. The same parts as in the above described exemplary embodiment 1 are assigned with the same signs and overlapping description will be omitted. A surface emitting part 101 is formed by allowing a crystal of Ga, In, N, or the like to grow on a sapphire substrate 102. On ends of the surface emitting part 101, bonding wires 103 are provided. The surface emitting part 101 emits light with substantially equal intensity in all directions from a planer emitting region. That is, the surface emitting part 101 functions as a so-called Lambertian surface. Additionally, on one surface side of the surface emitting part 101, a reflecting metal electrode 106 as a reflecting part is provided. Further, on the other surface side of the surface emitting part 101, a square pyramid prism 104 including of an optical transparent member of high refractive index glass is fixed with an optical adhesive.

On the exit side of the square pyramid prism 104, a grid polarizer 810 is provided. The grid polarizer 810 can be manufactured, for example, by patterning aluminum linearly on a glass substrate at intervals in the order of a wavelength or less. The grid polarizer 810 has a function of a polarizing plate to transmit p-polarized light as a polarization component in the first vibrating direction and to reflect s-polarized light as a polarization component in the second vibrating direction different from the first vibrating direction. Further, within the optical path between the square pyramid prism 104 and the grid polarizer 810, a sheet-like quarter wavelength plate 807 is further provided. The quarter wavelength plate 807 and the grid polarizer 810 are fixed with an optical transparent adhesive. Furthermore, an optical guide part 810 in a hollow cylinder shape is provided so as to surround the square pyramid prism 104. On the inner circumferential surface of the optical guide part 810, a reflecting surface 810a to reflect light output from the square pyramid prism 104 is formed. The reflecting surface 810a is formed by depositing metal, such as Ag.

In the exemplary embodiment, instead of providing the polarization splitter films 610 on the inclined surfaces of the square pyramid prism 104, on the exit side of the square pyramid prism 104, the grid polarizer 810 as a polarizing plate to transmit p-polarized light as a polarization component in the first vibrating direction and reflecting s-polarized light as polarization component in the second vibrating direction different from the first vibrating direction is provided. Thereby, the light emitted from the surface emitting part 101, refracted by the inclined surface 105a of the square pyramid prism 104 and output enters the grid polarizer 810. Then, the grid polarizer 810 transmits the p-polarized light L82 as light in the first vibrating direction and output it. Further, the s-polarized light as light in the second vibrating direction different from the first vibrating direction is reflected by the grid polarizer. The s-polarized light reflected by the grid polarizer 810 enters the quarter wavelength plate 807.

The s-polarized light is transmitted through the quarter wavelength plate 807 and becomes circularly polarized light, and travels toward the square pyramid prism 104. Then, the circularly polarized light is reflected by the reflecting metal electrode 106 as a reflecting part and becomes reversely rotating circularly polarized light. Then, the reversely rotating circularly polarized light is transmitted through the surface emitting part 101 again, refracted by the inclined surface 105a of the square pyramid prism 104 and output. The circularly polarized light output from the inclined surface 105a is transmitted through the quarter wavelength plate 807 and converted into linearly polarized light rotated substantially 90° compared with the s-polarized state as a polarized state before entering the quarter wavelength plate 807, i.e., p-polarized light. Accordingly, when the p-polarized light L81 is transmitted through the grid polarizer 810 and output. Thereby, the light aligned as p-polarized light in the first vibrating direction can be taken out efficiently.

Furthermore, in the exemplary embodiment, the optical guide part 810 is provided so as to surround the square pyramid prism 104. It is desired that the height of the optical guide part 810 is substantially the same as the height of the square pyramid prism 104. Since the square pyramid prism 104 is surrounded by the optical guide part 810, the light L83 output from the prism is reflected by the reflecting surface 810a formed on the inner circumferential surface of the optical guide part 810. Therefore, the light never diffuses outwardly of the optical guide part 810. Thereby, the light can be taken out efficiently from the region having substantially the same area as the surface emitting part 101.

Exemplary Embodiment 5

Figure 9:
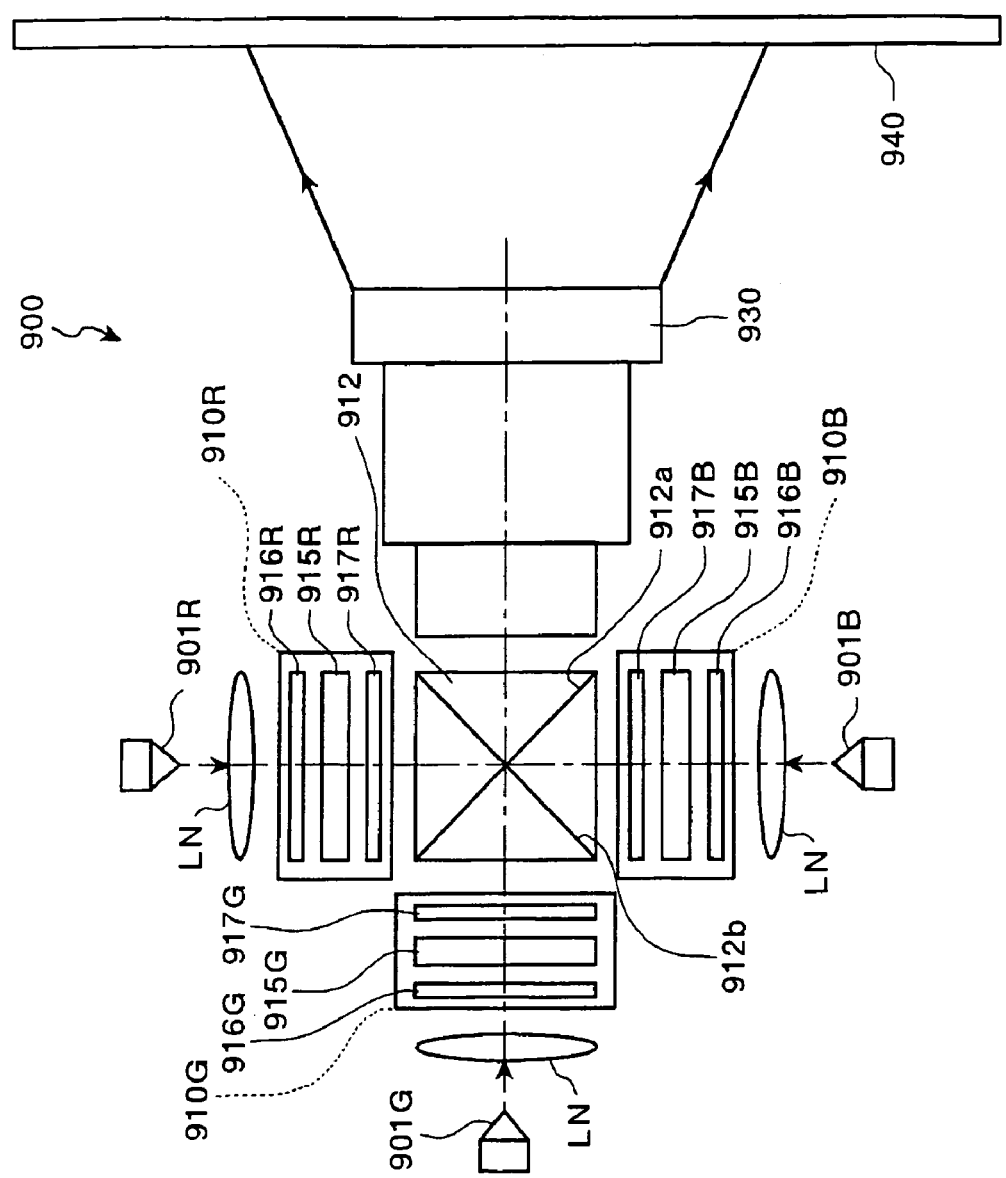
FIG. 9 is a schematic of a projector of exemplary embodiment 5.

FIG. 9 shows the general constitution of a projector according to exemplary embodiment 5 of the invention. A projector 900 has a first light source unit 901R to supply R light as first color light, a second light source unit 901G to supply G light as second color light, and a third light source unit 901B to supply B light as third color light. The first light source unit 901R, the second light source unit 901G, and the third light source unit 901B are surface emitting LEDs as light source units as described in exemplary embodiment 3 and exemplary embodiment 4, respectively.

The first light source unit 901R is arranged so as to emit p-polarized R light. The R light is transmitted through a lens LN and enters an R-light spatial light modulator unit 910R as a first color light spatial light modulator unit. The R-light spatial light modulator unit 910R is a transmissive liquid crystal display unit to modulate R light in response to an image signal. The R-light spatial light modulator unit 910R includes a liquid crystal panel 915R, a first polarizing plate 916R, and a second polarizing plate 917R.

The first polarizing plate 916R transmits the R light as p-polarized light and allows it to enter the liquid crystal panel 915R. The liquid crystal panel 915R modulates the p-polarized light in response to an image signal and converts it into s-polarized light. The second polarizing plate 917R outputs the R light that has been converted into the s-polarized light in the liquid crystal panel 915R. Thus, the R-light spatial light modulator unit 910R modulates R light from the first light source unit 901R in response to an image signal. The R light that has been converted into the s-polarized light in the R-light spatial light modulator unit 910R enters a cross dichroic prism 912.

The second light source unit 901G is arranged so as to emit s-polarized G light. The s-polarized G light is transmitted through a lens LN and enters a G-light spatial light modulator unit 910G as a second color light spatial light modulator unit. The G-light spatial light modulator unit 910G is a transmissive liquid crystal display unit to modulate G light in response to an image signal. The G-light spatial light modulator unit 910G includes a liquid crystal panel 915G, a first polarizing plate 916G, and a second polarizing plate 917G.

The first polarizing plate 916G transmits the s-polarized G light and allows it to enter the liquid crystal panel 915G. The liquid crystal panel 915G modulates the s-polarized light in response to an image signal and converts it into p-polarized light. The second polarizing plate 917G outputs the G light that has been converted into the s-polarized light in the liquid crystal panel 915G. Thus, the G-light spatial light modulator unit 910G modulates G light from the second light source unit 901G in response to an image signal. The G light that has been converted into the p-polarized light in the G-light spatial light modulator unit 910G enters the cross dichroic prism 912.

The third light source unit 901B is arranged so as to emit p-polarized B light. The p-polarized B light is transmitted through a lens LN and enters an B-light spatial light modulator unit 910B as a third color light spatial light modulator unit. The B-light spatial light modulator unit 910B is a transmissive liquid crystal display unit for modulating B light in response to an image signal. The B-light spatial light modulator unit 910B includes a liquid crystal panel 915B, a first polarizing plate 916B, and a second polarizing plate 917B.

The first polarizing plate 916B transmits the p-polarized B light and allows it to enter the liquid crystal panel 915B. The liquid crystal panel 915B modulates the p-polarized light in response to an image signal and converts it into s-polarized light. The second polarizing plate 917B outputs the B light that has been converted into the s-polarized light in the liquid crystal panel 915B. Thus, the B-light spatial light modulator unit 910B modulates B light from the third light source unit 901B in response to an image signal. The B light that has been converted into the s-polarized light in the B-light spatial light modulator unit 910B enters the cross dichroic prism 912.

The cross dichroic prism 912 has two dichroic films 912a and 912b. The two dichroic films 912a and 912b are disposed perpendicularly in an X-shape. The dichroic film 912a reflects R light as s-polarized light and transmits G light as p-polarized light. The dichroic film 912b reflects B light as s-polarized light and transmits G light as p-polarized light. Thus, the cross dichroic prism 912 combines R light, G light, and B light modulated by the first color light spatial light modulator unit 910R, the second color light spatial light modulator unit 910G, and the third color light spatial light modulator unit 910B, respectively. A projection lens 930 projects the light combined by the cross dichroic prism 912 onto a screen 940.

In the exemplary embodiment, the light source unit described in exemplary embodiment 3 or exemplary embodiment 4 is used. Therefore, a bright projection image with high light utilization efficiency can be obtained. In the case of the light source unit of exemplary embodiment 3 or exemplary embodiment 4, because polarized light in a specific vibrating direction can be supplied, a polarization converting unit becomes unnecessary. In the case of using the light source unit to supply randomly polarized light as in the above described exemplary embodiment 1 or exemplary embodiment 2, a polarization converting unit to convert randomly polarized light into p-polarized light or s-polarized light may be provided appropriately.

In the above described respective exemplary embodiments, the unit is described by taking an example of the square pyramid prism or the conical prism. However, exemplary aspects of the invention are not limited to that and any polyangular prism may be used. Further, plural light sources of the invention arranged in an array may be included.

Industrial Applicability

As described above, the unit according to exemplary aspects of the invention is useful in, for example, a projector.

What is claimed is:

1. A light source unit, comprising:
   a surface emitting part including a planer emitting region to emit light;
   a reflecting part provided on one surface side of the surface emitting part; and
   a conical prism or a pyramid prism, each having a bottom surface and an inclined surface, provided on an other surface side of the surface emitting part and including an optical transparent member,
   the bottom surface of the conical prism or the bottom surface of the pyramid prism having substantially the same size and shape as the planer emitting region,
   the inclined surface of the conical prism or the inclined surface of the pyramid prism outputting light refracted by the inclined surface in a specific direction and guiding light reflected by the inclined surface toward the bottom surface, of light that has entered the conical prism or the pyramid prism from the bottom surface, and
   the reflecting part reflecting light that has been reflected by the inclined surface and transmitted through the bottom surface and the surface emitting part again toward the conical prism or the pyramid prism.

2. The light source unit according to claim 1, an apex angle of the conical prism or an apex angle formed by opposed inclined surfaces of the pyramid prism being substantially 90°.

3. The light source unit according to claim 1, a diffusing plate to scatter incident light being provided on the bottom surface.

4. The light source unit according to claim 1, the pyramid prism being a square pyramid prism having four inclined surfaces,
   polarization splitter films to transmit a polarization component in a specific vibrating direction and reflecting a polarization component substantially perpendicular to the specific vibrating direction with respect to the respective inclined surfaces being formed on the four inclined surfaces,
   a pair of the opposed inclined surfaces further having wave plates to rotate a vibrating direction of the transmitted light substantially 90° on the polarization splitter films, and
   the four inclined surfaces outputting light in an aligned vibrating direction.

5. The light source unit according to claim 4, a quarter wavelength plate or the diffusing plate to make a vibrating direction of polarized light random being formed on the bottom surface.

6. The light source unit according to claim 1, further comprising:
   a polarizing plate provided on the inclined surface side of the pyramid prism or the conical prism to transmit a polarization component in a first vibrating direction and reflecting a polarization component in a second vibrating direction different from the first vibrating direction.

7. The light source unit according to claim 6, further comprising:
   a quarter wavelength plate within an optical path between the pyramid prism or the conical prism and the polarizing plate.

8. The light source unit according to claim 6, further comprising:
   an optical guide part provided so as to surround the pyramid prism or the conical prism and having a reflecting surface to reflect light output from the pyramid prism or the conical prism formed therein.

9. A projector, comprising:
   the light source unit according to claim 1;
   a spatial light modulator unit to modulate light from the light source unit in response to an image signal; and
   a projection lens to project the modulated light.

10. The projector according to claim 9, an apex angle of the conical prism or an apex angle formed by opposed inclined surfaces of the pyramid prism being substantially 90°.

11. The projector according to claim 9, a diffusing plate to scatter incident light being provided on the bottom surface.

12. The projector according to claim 9, the pyramid prism being a square pyramid prism having four inclined surfaces,
   polarization splitter films to transmit a polarization component in a specific vibrating direction and reflecting a polarization component substantially perpendicular to the specific vibrating direction with respect to the respective inclined surfaces being formed on the four inclined surfaces,
   a pair of the opposed inclined surfaces further having wave plates to rotate a vibrating direction of the transmitted light substantially 90° on the polarization splitter films, and
   the four inclined surfaces outputting light in an aligned vibrating direction.

13. The projector according to claim 12, a quarter wavelength plate or the diffusing plate to make a vibrating direction of polarized light random being formed on the bottom surface.

14. The projector according to claim 9, further comprising:
   a polarizing plate provided on the inclined surface side of the pyramid prism or the conical prism to transmit a polarization component in a first vibrating direction and reflecting a polarization component in a second vibrating direction different from the first vibrating direction.

15. The projector according to claim 14, further comprising:
   a quarter wavelength plate within an optical path between the pyramid prism or the conical prism and the polarizing plate.

16. The projector according to claim 14, further comprising:
   an optical guide part provided so as to surround the pyramid prism or the conical prism and having a reflecting surface to reflect light output from the pyramid prism or the conical prism formed therein.

* * * * *